US012712432B2

(12) United States Patent
Inoue et al.

(10) Patent No.: US 12,712,432 B2
(45) Date of Patent: Aug. 18, 2026

(54) POWER CONVERSION DEVICE

(71) Applicant: Mitsubishi Electric Corporation, Tokyo (JP)

(72) Inventors: Hirofumi Inoue, Tokyo (JP); Kohei Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 142 days.

(21) Appl. No.: 18/855,108

(22) PCT Filed: Oct. 31, 2022

(86) PCT No.: PCT/JP2022/040687
§ 371 (c)(1),
(2) Date: Oct. 8, 2024

(87) PCT Pub. No.: WO2023/218681
PCT Pub. Date: Nov. 16, 2023

(65) Prior Publication Data

US 2026/0180423 A1 Jun. 25, 2026

(30) Foreign Application Priority Data

May 10, 2022 (JP) ................................ 2022-077393

(51) Int. Cl.
*H02M 7/537* (2006.01)
*H02M 1/00* (2006.01)
(Continued)

(52) U.S. Cl.
CPC ........... *H02M 1/007* (2021.05); *H02M 7/003* (2013.01); *H02M 7/48* (2013.01); *H02M 7/493* (2013.01);
(Continued)

(58) Field of Classification Search
CPC .......... H02M 7/003; H02M 7/02; H02M 7/00; H02M 7/48; H02M 7/4807; H02M 7/4803; H02M 7/493; H02M 7/537; H02M 7/5387; H02M 1/007; H02M 1/0074; H02M 1/0077
See application file for complete search history.

(56) References Cited

U.S. PATENT DOCUMENTS 10,717,366 B1 * 7/2020 Jaksic ..................... B60L 50/16
10,826,282 B2 * 11/2020 Cao .......................... H02B 1/20
2013/0265724 A1 * 10/2013 Kaneko .................. H05K 7/209
361/715

FOREIGN PATENT DOCUMENTS

JP 2014-168360 A 9/2014

* cited by examiner

*Primary Examiner* — Nguyen Tran
(74) *Attorney, Agent, or Firm* — Sughrue Mion, PLLC

(57) ABSTRACT

A shield plate is used for reducing an influence that noise generated from a power conversion module has on a control board, and the shield plate is fastened to a resin member provided with a busbar by screw fixation from above. Thus, these are provided as separate members and the number of components increases, so that there is a problem in decrease in the number of assembly steps and size reduction. In the present disclosure, a DC busbar positive electrode, a DC busbar negative electrode, and a shield plate are stacked with non-conductive members interposed therebetween, and are integrated together with AC busbars and sensor cores by resin, to form a busbar assembly. The busbar assembly is provided between the power conversion module and the control board.

9 Claims, 10 Drawing Sheets

(51) Int. Cl.

| | |
|---|---|
| ***H02M 7/00*** | (2006.01) |
| ***H02M 7/48*** | (2007.01) |
| ***H02M 7/493*** | (2007.01) |
| ***H02M 7/5387*** | (2007.01) |

(52) U.S. Cl.
CPC ......... *H02M 7/537* (2013.01); *H02M 7/5387* (2013.01)

POWER CONVERSION DEVICE

CROSS REFERENCE TO RELATED APPLICATIONS

This application is a National Stage of International Application No. PCT/JP2022/040687 filed Oct. 31, 2022, claiming priority based on Japanese Patent Application No. 2022-077393 filed May 10, 2022.

TECHNICAL FIELD

The present disclosure relates to a power conversion device.

BACKGROUND ART

Vehicles such as an electric vehicle and a hybrid vehicle are provided with a power conversion device which performs power conversion between DC power and AC power. The power conversion device includes a power conversion module of an insulated gate bipolar transistor (IGBT) or the like and performs converter operation of converting DC power to three-phase AC power to regenerate energy. There is known a configuration in which a shield plate for reducing an influence that noise generated from the power conversion module has on a control board is fastened to a resin member provided with a busbar by screw fixation from above (see, for example, Patent Document 1).

CITATION LIST

Patent Document

Patent Document 1: Japanese Laid-Open Patent Publication No. 2014-168360

SUMMARY OF THE INVENTION

Problem to be Solved by the Invention

Since the shield plate, the busbar, and the resin member are provided as separate members, the number of components increases, so that there is a problem in decrease in the number of assembly steps and size reduction.

The present disclosure has been made to solve the above problem, and an object of the present disclosure is to provide a power conversion device having a decreased number of components, thus improving assemblability and enabling size reduction.

Means to Solve the Problem

A power conversion device according to the present disclosure includes: a power conversion module which includes a switching element and performs power conversion between DC and AC through turning on and off of the switching element; a DC busbar having a positive electrode and a negative electrode which are connected to DC terminals of the power conversion module and through which DC current is inputted/outputted; an AC busbar which is connected to AC terminals of the power conversion module and through which AC current is inputted/outputted; a sensor core for detecting the AC current; a shield plate; and a control board including an electronic circuit for performing ON/OFF control of the power conversion module. The DC busbar includes a flat-plate-shaped DC busbar positive electrode and a flat-plate-shaped DC busbar negative electrode. The DC busbar positive electrode, the DC busbar negative electrode, and the shield plate are stacked with non-conductive members interposed therebetween, and are integrated together with the AC busbar and the sensor core by non-conductive resin, to form a busbar assembly. The busbar assembly is provided between the power conversion module and the control board.

Effect of the Invention

In the power conversion device according to the present disclosure, the shield plate is integrated by molding together with the DC busbar, the AC busbar, and the sensor core, to form the busbar assembly. Therefore, screw fastening for the shield plate can be omitted, so that the number of components can be decreased. In addition, owing to integral molding together with the busbars, the height is reduced, so that size reduction is achieved.

DESCRIPTION OF EMBODIMENTS

Figure 1:
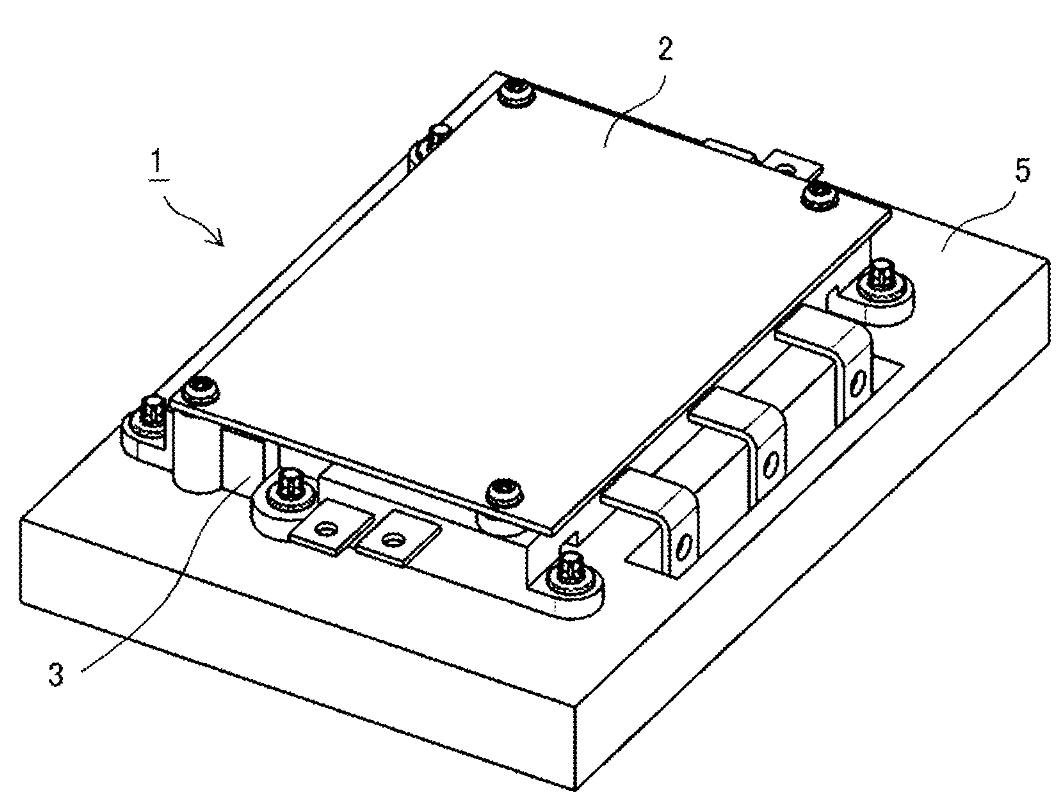
FIG. 1 is a perspective view of a power conversion device according to embodiment 1.

Hereinafter, a preferred embodiment of a power conversion device according to the present disclosure will be described with reference to the drawings. The same matters and corresponding parts are denoted by the same reference characters and the detailed description thereof is not repeated.

Embodiment 1

Figure 2:
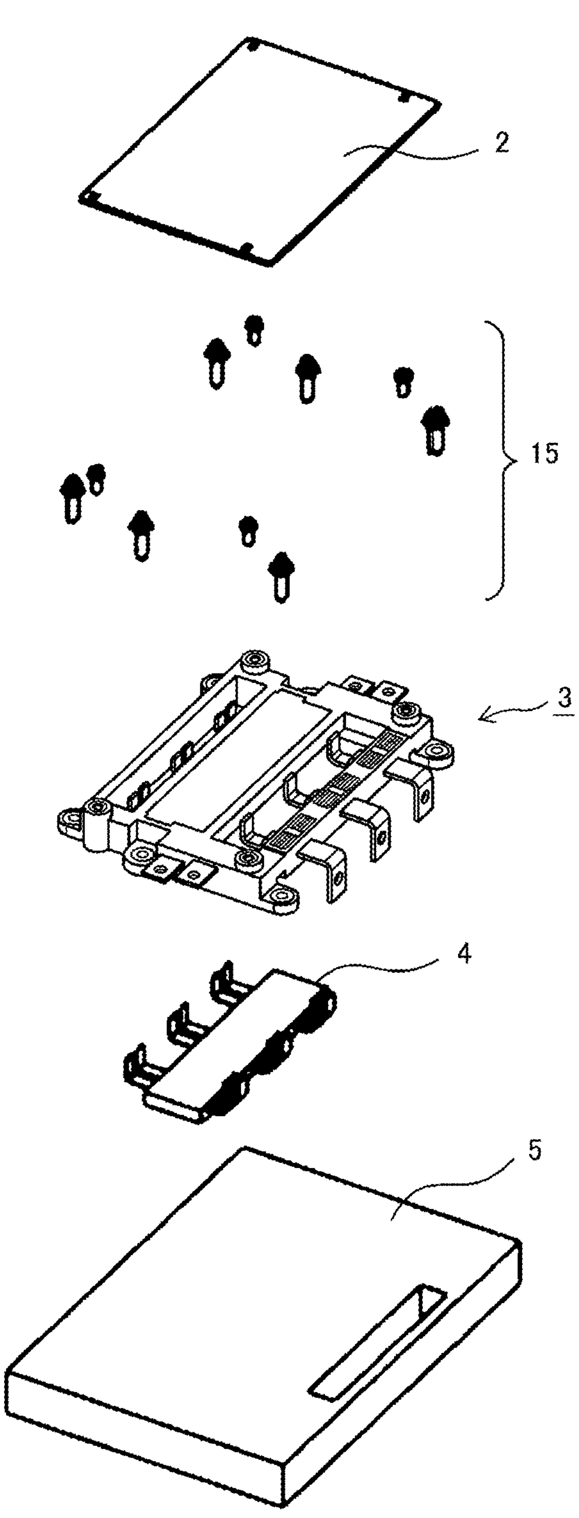
FIG. 2 is an exploded perspective view of the power conversion device according to embodiment 1.

FIG. 1 is a perspective view of a power conversion device 1 of embodiment 1, and FIG. 2 is an exploded perspective view of the power conversion device 1 shown in FIG. 1. In FIG. 1 and FIG. 2, the power conversion device 1 includes a power conversion module 4 forming a power conversion unit stored in a housing 5, a control board 2 having an electronic circuit (not shown) such as an IC for performing ON/OFF control of a switching element such as an IGBT that the power conversion module 4 has, and a busbar assembly 3 electrically connected to the power conversion module 4.

As shown in FIG. 2, the power conversion module 4 is provided at the housing 5, the busbar assembly 3 is provided above the power conversion module 4 so as to cover the power conversion module 4, and the busbar assembly 3 is fastened to the housing 5 by screws 15. The control board 2 is attached to an upper part of the busbar assembly 3.

Figure 3:
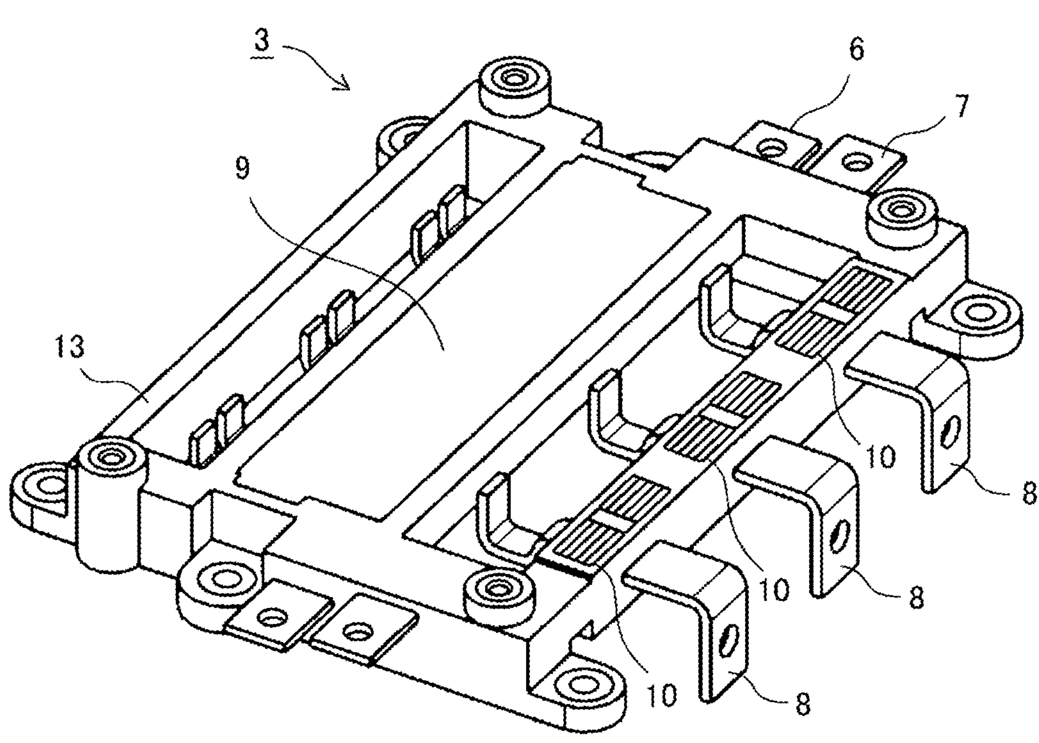
FIG. 3 is a perspective view of a busbar assembly according to embodiment 1.
Figure 4:
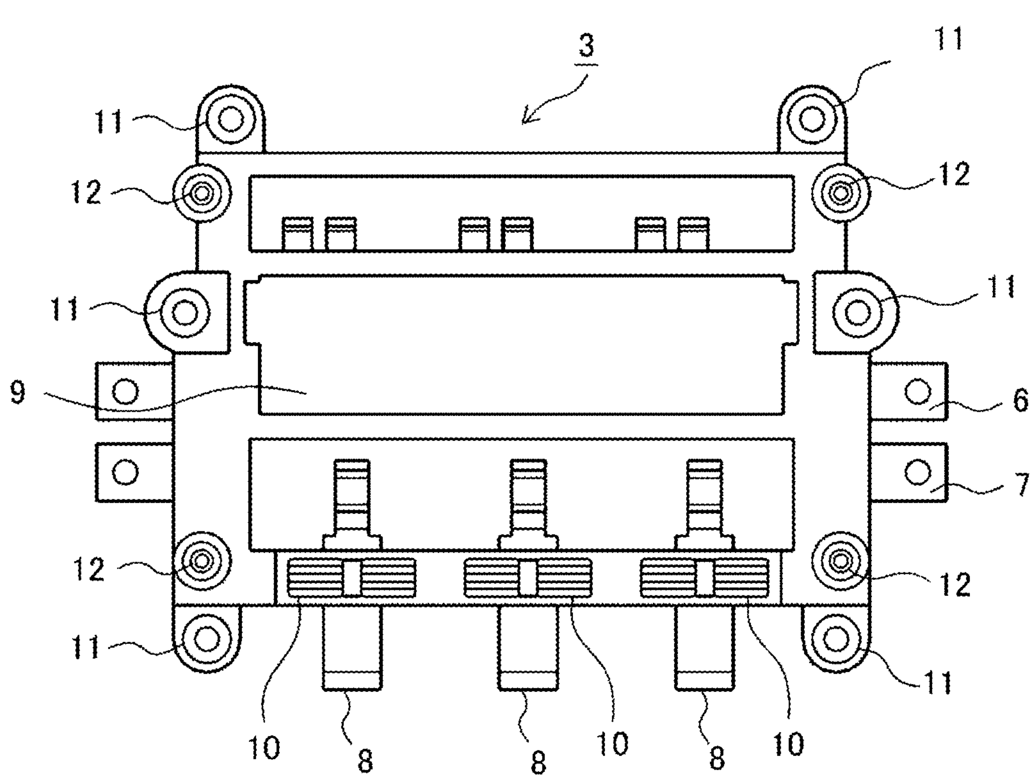
FIG. 4 is a top view of the busbar assembly according to embodiment 1.

FIG. 3 is a perspective view of the busbar assembly 3, and FIG. 4 is a top view of the busbar assembly 3. The busbar assembly 3 includes a DC busbar positive electrode 6 and a DC busbar negative electrode 7 through which DC current is inputted/outputted, AC busbars 8 which are connected to a motor (not shown) and through which AC currents converted by the power conversion module 4 are inputted/outputted, a shield plate 9 which blocks noise generated from the power conversion module 4 through switching of an IGBT or the like in power conversion, and sensor cores 10 for detecting AC currents. For example, capacitors (not shown) or the like are connected to both ends of the DC busbar positive electrode 6 and the DC busbar negative electrode 7.

Figure 5:
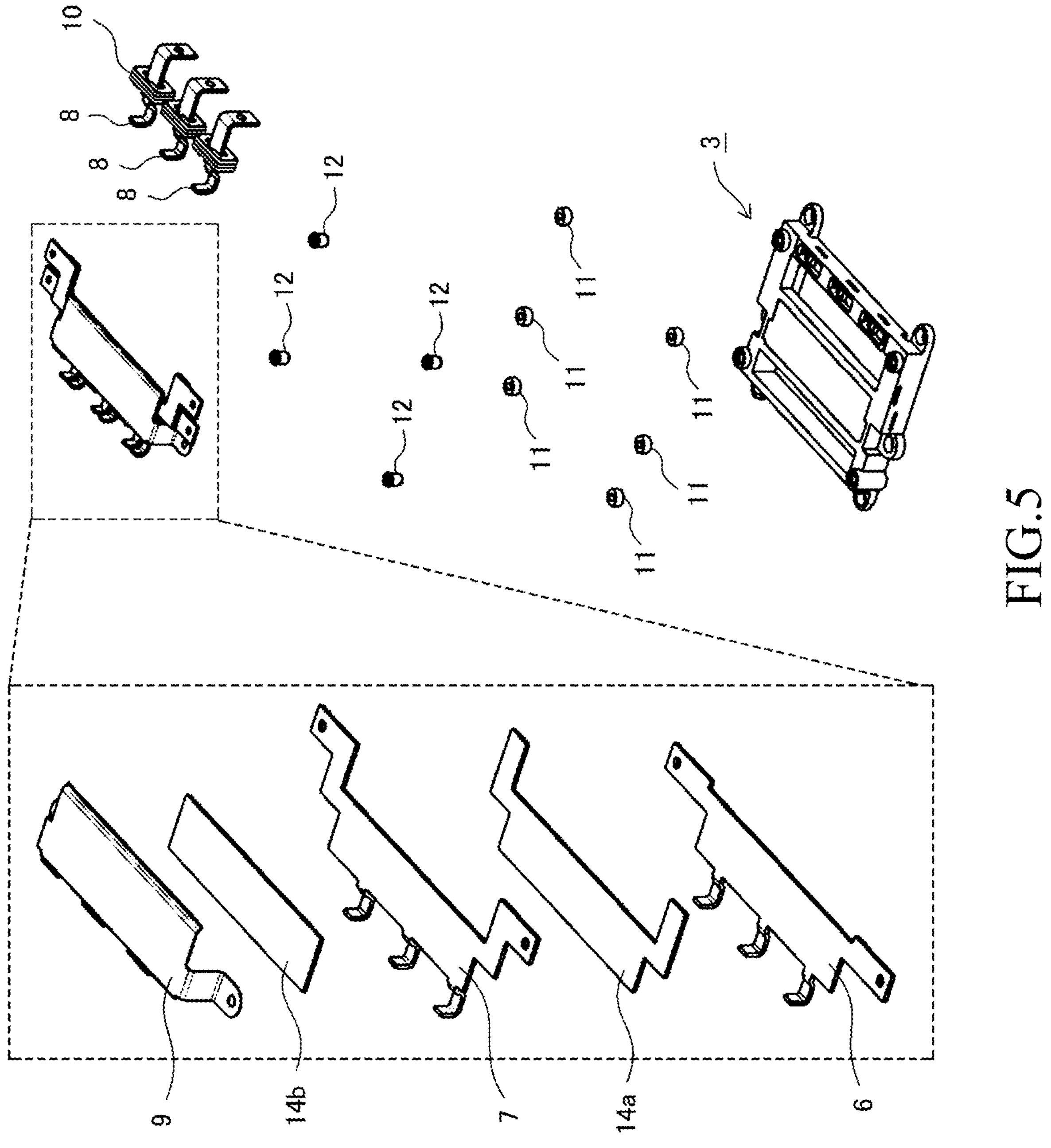
FIG. 5 is an exploded perspective view of the busbar assembly according to embodiment 1.
Figure 6:
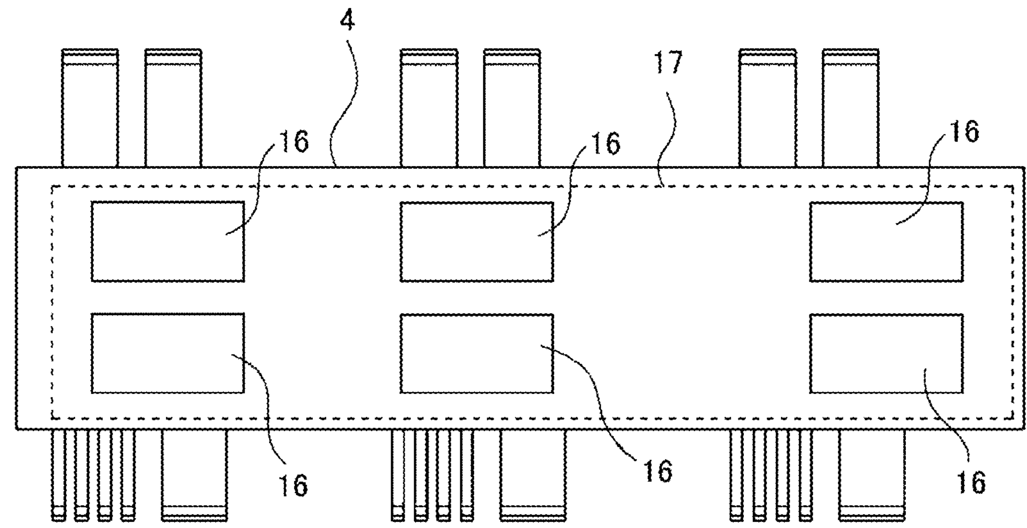
FIG. 6 is a top view of a power conversion module according to embodiment 1.
Figure 7:
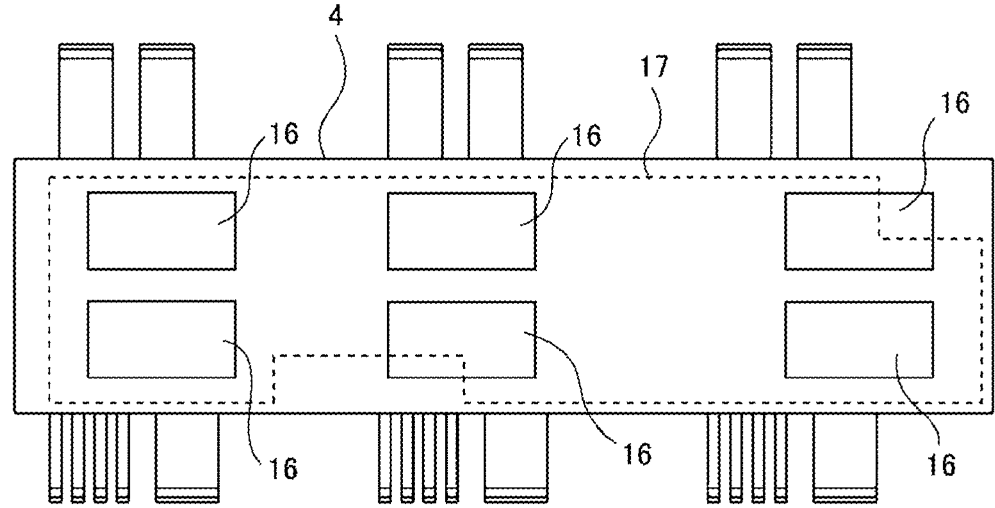
FIG. 7 is a top view of the power conversion module according to embodiment 1.

FIG. 5 is an exploded perspective view of the busbar assembly 3, FIG. 6 and FIG. 7 are top views of the power conversion module 4, and FIG. 8 to FIG. 11 are perspective views of components forming the busbar assembly. In a case where the DC busbar positive electrode 6, the DC busbar negative electrode 7, and the AC busbars 8 are provided at the housing 5 made of metal, if they directly contact with each other, electric connection points are formed, resulting in failure. Therefore, non-conductive resin 13 (hereinafter, referred to as resin 13) for obtaining appropriate dielectric withstand voltage is molded integrally with the DC busbar positive electrode 6, the DC busbar negative electrode 7, and the AC busbars 8, whereby insulation between the housing 5, and the DC busbar positive electrode 6, the DC busbar negative electrode 7, and the AC busbars 8, is kept.

The shield plate 9 is provided between the control board 2, and the DC busbar positive electrode 6 and the DC busbar negative electrode 7 (see FIG. 5 and FIG. 2). The shield plate 9 is located in an area extended upward from a flat-surface portion of the power conversion module 4 opposed to switching elements 16. That is, as shown in FIG. 6, the shield plate 9 has a flat-surface portion (a flat-surface portion covering a predetermined range on the power conversion module 4 where the switching elements 16 are present) 9*a* covering at least a range 17 of the power conversion module 4 on which the switching elements 16 are projected, and is located in an area extended upward from the range 17 of the power conversion module 4. As shown in FIG. 7, the shield plate may be partially cut out so that the individual switching elements 16 are not entirely covered, and there is no problem as long as the shield plate covers a sufficient range for reducing noise of the power conversion module 4.

Figure 8:
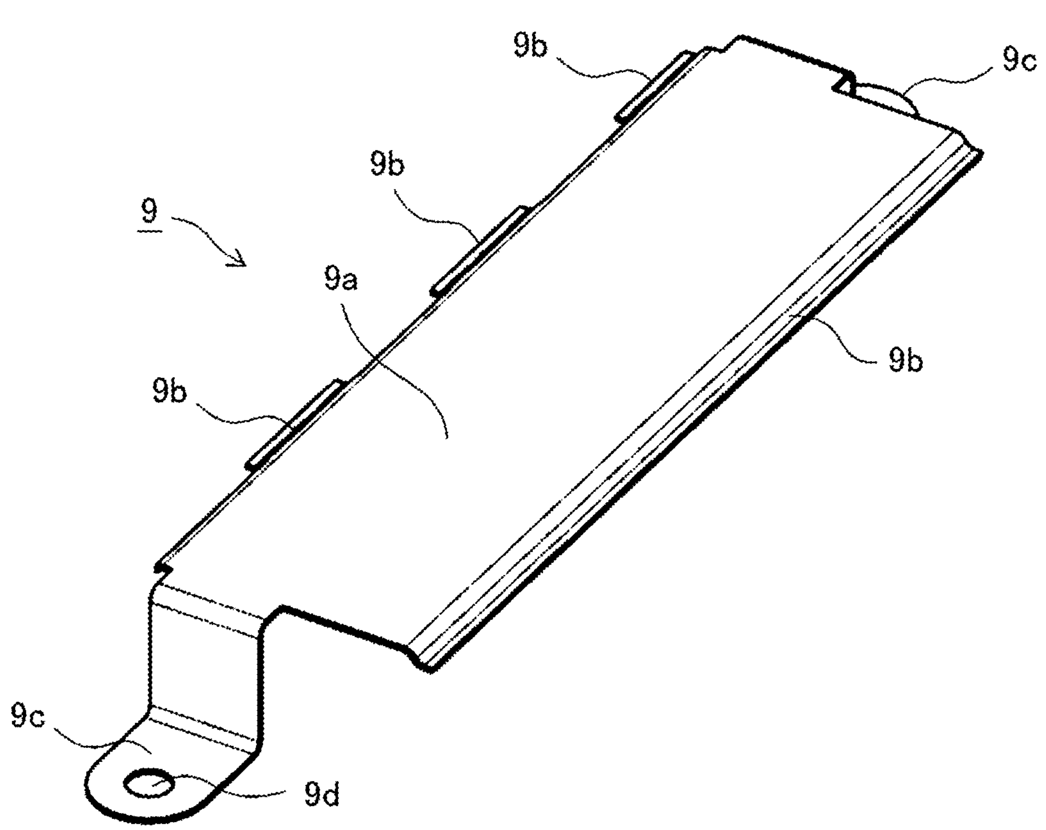
FIG. 8 is a perspective view of a shield plate according to embodiment 1.
Figure 9:
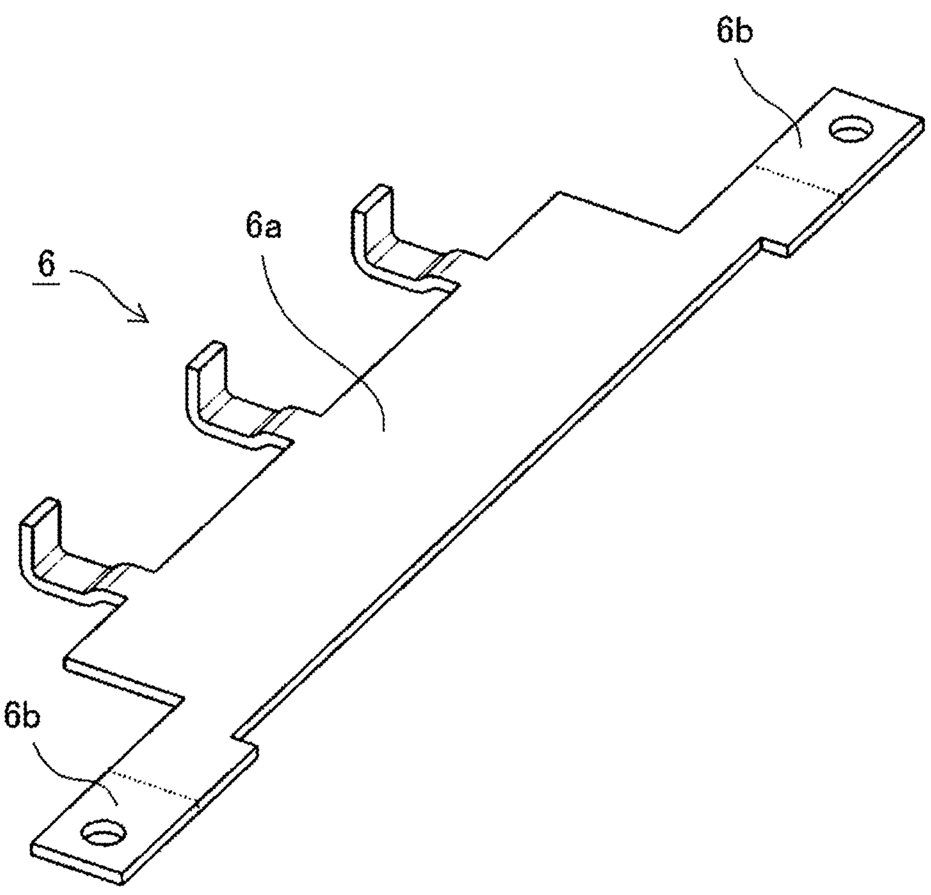
FIG. 9 is a perspective view of a DC busbar positive electrode according to embodiment 1.

The shield plate 9 is formed of an aluminum material, and as shown in FIG. 8, a plurality of bending-worked portions 9*b* are provided to the flat-surface portion 9*a* opposed to the control board 2, so that the shield plate 9 covered with the resin 13 is prevented from coming off the resin 13. Some bent portions 9*c* have holes 9*d* through which the screws 15 penetrate. Metal collars 11 overlap the corresponding holes 9*d* for penetration, and the shield plate 9 is connected to the housing 5 by the screws 15. Thus, noise generated from the power conversion module 4 flows through the shield plate 9 to the housing 5 connected to a vehicle body, so that noise is reduced.

As shown in FIG. 5, the DC busbar positive electrode 6 is stacked above the power conversion module 4, the DC busbar negative electrode 7 is stacked above the DC busbar positive electrode 6, and the shield plate 9 is stacked above the DC busbar negative electrode 7 so that they are arranged as parallel flat plates. Thus, heat from the power conversion module 4, the DC busbar positive electrode 6, and the DC busbar negative electrode 7 can be efficiently dissipated to the housing 5.

To obtain corrosion resistance, the surface of the shield plate 9 may be plated. In a case of using a pre-plating material, a plating material that withstands the molding temperature is preferably selected. As long as there is no influence on noise, a hole may be provided in the flat-surface portion 9*a* of the shield plate 9 so as to improve molding performance.

Figure 10:
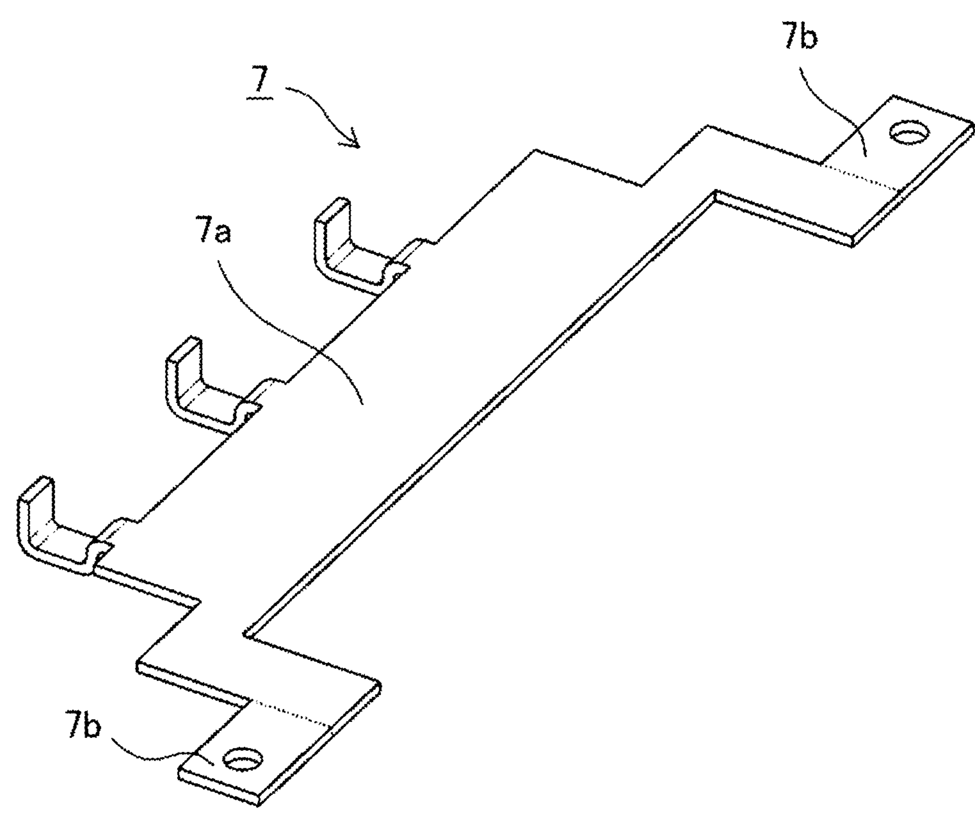
FIG. 10 is a perspective view of a DC busbar negative electrode according to embodiment 1.

Next, formation of the busbar assembly 3 with the resin 13 molded integrally will be described in detail. In a case where two of the DC busbar positive electrode 6 and the DC busbar negative electrode 7 are integrated with the resin 13, the DC busbar positive electrode 6 shown in FIG. 9 and the DC busbar negative electrode 7 shown in FIG. 10 are covered by the resin 13 around four side surfaces over almost entire areas of an extending portion 6*a* and an extending portion 7*a* except for extending portions 6*b*, 7*b*. The four side surfaces of each of the extending portion 6*a* and the extending portion 7*a* are two surfaces opposed to each other in the thickness direction of each of the extending portion 6*a* and the extending portion 7*a* (flat-surface portions of each extending portion 6*a*, 7*a*) and two surfaces connecting the above two surfaces in the thickness direction (lateral side surface parts of extending portions 6*a*, 7*a*). Thus, the extending portion 6*a* and the extending portion 7*a* penetrate through the resin 13 in the longitudinal direction, and the resin 13 surrounds the four side surfaces of each of the extending portion 6*a* and the extending portion 7*a*.

Two of the DC busbar positive electrode 6 and the DC busbar negative electrode 7 are retained in a parallel and separated state, and the resin 13 is interposed therebetween. The shield plate 9 is also retained in a parallel and separate state as with the DC busbar positive electrode 6 and the DC busbar negative electrode 7, and the resin 13 is interposed therebetween.

Between the DC busbar positive electrode 6 and the DC busbar negative electrode 7, between the shield plate 9 and the DC busbar positive electrode 6, or between the shield plate 9 and the DC busbar negative electrode 7, a non-conductive molding member 14*a* and a non-conductive molding member 14*b* may be interposed instead of the resin 13, as shown in FIG. 5.

Thus, under the part where the shield plate 9 is placed, the DC busbar positive electrode 6 and the DC busbar negative electrode 7 are placed, and they are integrated together with the AC busbars 8 and the sensor cores 10 by molding with the non-conductive resin 13, except for the flat-surface portion 9*a* of the shield plate 9 opposed to the control board 2.

Figure 11:
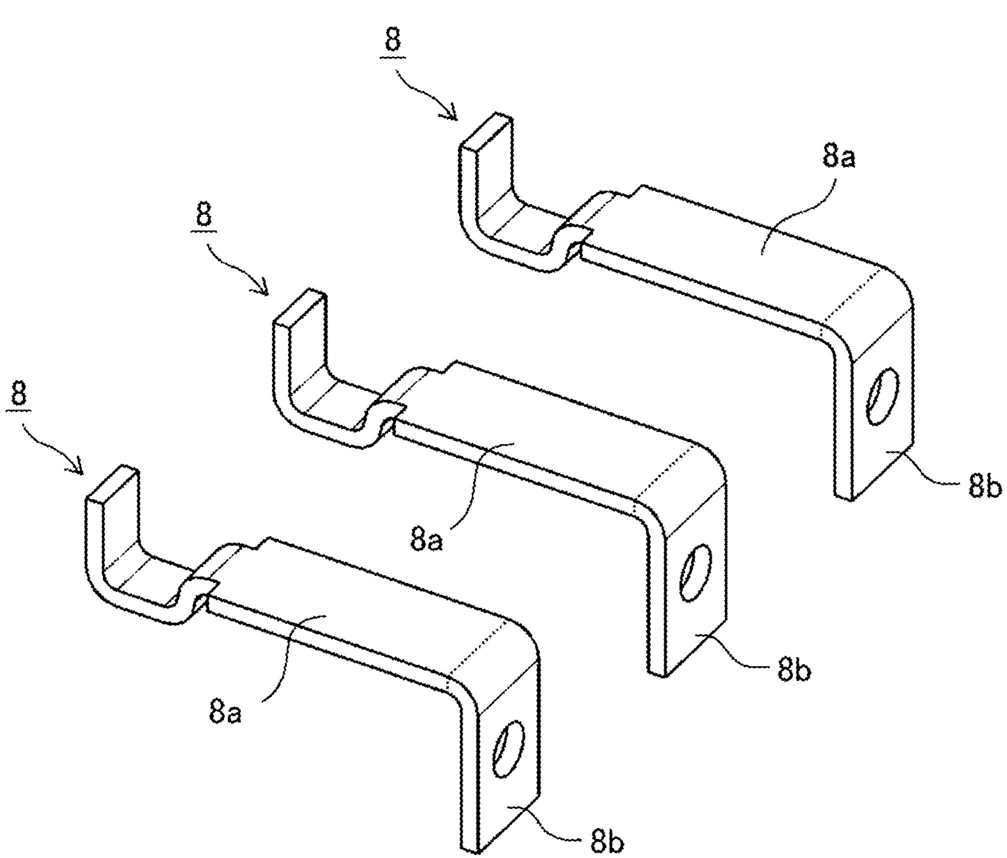
FIG. 11 is a perspective view of AC busbars according to embodiment 1.

Three AC busbars 8 through which AC currents are inputted/outputted, shown in FIG. 11, are also covered by the resin 13 around four sides surfaces over almost entire areas of extending portions 8*a*, as with the DC busbar positive electrode 6 and the DC busbar negative electrode 7. Each AC busbar 8 has an AC connection portion 8*b* at one end. In the present embodiment, the number of the AC busbars 8 is three, but is not particularly limited.

As materials of the DC busbar positive electrode 6, the DC busbar negative electrode 7, and the AC busbars 8, copper is preferably used in terms of power efficiency. If the linear expansion coefficient of the resin 13 is close to the thermal expansion coefficients of the DC busbar positive electrode 6, the DC busbar negative electrode 7, and the AC busbars 8, it is possible to prevent separation or crack of the resin due to temperature increase in at least one of the DC busbar positive electrode 6, the DC busbar negative electrode 7, and the AC busbars 8.

With the configuration as described above, the shield plate 9 is integrated by molding together with the DC busbar positive electrode 6, the DC busbar negative electrode 7, the AC busbars 8, and the sensor cores 10, to form the busbar assembly 3. Therefore, screw fastening for the shield plate 9 can be omitted, so that the number of components can be decreased. Thus, the assembly process can be simplified, whereby work efficiency is improved, so that yield can be increased. In addition, owing to integral molding together with the busbars, the height is reduced, so that size reduction is achieved. As long as there is no influence on components mounted to the control board 2, the resin 13 may cover the shield plate 9.

Since the screws 15 are used as means for fixing the control board 2 as described above, nuts 12 may be integrated by molding with the resin 13, to form a terminal block. The metal collars 11 may be integrated by molding together with the DC busbar positive electrode 6, the DC busbar negative electrode 7, the AC busbars 8, the shield plate 9, and the sensor cores 10. The resin 13 is fastened to the housing 5 by being tightened with the screws 15, in a state of being opposed to the housing 5 or in contact therewith. This structure can withstand vibration of a vehicle.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure.

DESCRIPTION OF THE REFERENCE CHARACTERS

1 power conversion device
2 control board
3 busbar assembly
4 power conversion module
5 housing
6 DC busbar positive electrode
7 DC busbar negative electrode
8 AC busbar
9 shield plate
10 sensor core
11 metal collar
12 nut
13 resin
14*a*, 14*b* non-conductive molding member
15 screw
16 switching element

The invention claimed is:

1. A power conversion device comprising:

a power conversion module which includes a switching element and performs power conversion between DC and AC through turning on and off of the switching element;

a DC busbar having a positive electrode and a negative electrode which are connected to DC terminals of the power conversion module and through which DC current is inputted/outputted;

an AC busbar which is connected to AC terminals of the power conversion module and through which AC current is inputted/outputted;

a sensor core for detecting the AC current;

a shield plate; and a control board including an electronic circuit for performing ON/OFF control of the power conversion module, wherein the DC busbar includes a flat-plate-shaped DC busbar positive electrode and a flat-plate-shaped DC busbar negative electrode, the DC busbar positive electrode, the DC busbar negative electrode, and the shield plate are stacked with non-conductive members interposed therebetween, and are integrated together with the AC busbar and the sensor core by non-conductive resin, to form a busbar assembly, and the busbar assembly is provided between the power conversion module and the control board.

2. The power conversion device according to claim 1, wherein the shield plate has a flat-surface portion covering a predetermined range on the power conversion module where the switching element is present, so that noise generated at the power conversion module flows to a housing.

3. The power conversion device according to claim 2, wherein the shield plate has a bent portion at an end thereof, the bent portion is covered by the non-conductive resin, and a surface of the shield plate that is opposed to the control board is exposed from the non-conductive resin.

4. The power conversion device according to claim 1, wherein the shield plate is connected to a housing via a metal collar.

5. The power conversion device according to claim 4, wherein the metal collar is integrated with the busbar assembly by the non-conductive resin.

6. The power conversion device according to claim 2, wherein the shield plate is connected to a housing via a metal collar.

7. The power conversion device according to claim 6, wherein the metal collar is integrated with the busbar assembly by the non-conductive resin.

8. The power conversion device according to claim 3, wherein the shield plate is connected to a housing via a metal collar.

9. The power conversion device according to claim 8, wherein the metal collar is integrated with the busbar assembly by the non-conductive resin.

* * * * *